(12) United States Patent
Korney, Jr.

(10) Patent No.: US 6,617,376 B2
(45) Date of Patent: Sep. 9, 2003

(54) FLEXIBLE WOOD COMPOSITION

(75) Inventor: Arthur F. Korney, Jr., Pickerington, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 09/822,953

(22) Filed: Mar. 30, 2001

(65) Prior Publication Data

US 2002/0143083 A1 Oct. 3, 2002

(51) Int. Cl.$^7$ .......................... C08L 1/02; C08L 27/00; C08K 3/10; C08K 5/09
(52) U.S. Cl. .......................... 524/13; 524/14; 524/15; 524/16; 524/178; 524/179; 524/322; 524/419; 524/567
(58) Field of Search .......................... 524/13, 14, 15, 524/16, 178, 179, 322, 419, 567

(56) References Cited

U.S. PATENT DOCUMENTS

| | | | | |
|---|---|---|---|---|
| 3,888,810 A | * | 6/1975 | Shinomura | |
| 4,496,674 A | * | 1/1985 | Ehrhart et al. | |
| 4,551,294 A | * | 11/1985 | Wottka et al. | |
| 4,560,618 A | * | 12/1985 | Goswami | |
| 4,624,989 A | * | 11/1986 | Berta | |
| 4,746,688 A | | 5/1988 | Bistak et al. | ................ 523/220 |
| 6,004,668 A | * | 12/1999 | Deaner et al. | |
| 6,011,091 A | * | 1/2000 | Zehner | |

* cited by examiner

*Primary Examiner*—Tae H. Yoon
(74) *Attorney, Agent, or Firm*—Standley & Gilcrest LLP

(57) ABSTRACT

A flexible wood composition comprising at least one cellulosic filler and a material selected from the group consisting of thermoplastic elastomers and melt-processible rubbers. Additionally, the composition may include other ingredients including, but not limited to, a stabilizer, a lubricant, and a fatty acid. The composition can be used to make a variety of components such as flooring, gaskets, stair treads, weather stripping, hinges, sound absorption components, trim, seals, grips, surface treatment for various surfaces, bumpers, toys, buttons, and tubing.

4 Claims, 1 Drawing Sheet

FLEXIBLE WOOD COMPOSITION

BACKGROUND AND SUMMARY OF THE INVENTION

The present invention relates generally to composite materials and, more particularly, to a flexible wood composition. The present invention includes several different formulations and material composites including, but not limited to, formulations that include cellulosic material and/or inorganic material. The composition of the present invention can be used to make a variety of components, most preferably components that benefit from, or can at least tolerate, some degree of flexibility. In addition, the composition of the present invention can be used as an alternative to natural wood, rigid synthetic wood compositions, plastics, metals, and other conventional materials for making various types of components.

The supply of natural woods for construction and other purposes is dwindling. As a result, many are concerned about conserving the world's forests, and the cost of natural woods has risen. In light of these factors, a tremendous demand has developed in recent years for cellulosic/polymer composites that exhibit the look and feel of natural woods.

Rigid cellulosic/polymer composites are used as replacements for all-natural wood, particleboard, wafer board, and other similar materials. For example, U.S. Pat. Nos. 3,908,902, 4,091,153, 4,686,251, 4,708,623, 5,002,713, 5,055,247, 5,087,400, and 5,151,238 relate to processes for making wood replacement products. As compared to natural woods, rigid cellulosic/polymer composites offer superior resistance to wear and tear. In particular, rigid cellulosic/polymer composites have enhanced resistance to moisture. In fact, it is well known that the retention of moisture is a primary cause of the warping, splintering, and discoloration of natural woods. Moreover, rigid cellulosic/polymer composites can have the appearance of natural wood, and they may be sawed, sanded, shaped, turned, fastened, and finished in the same manner as natural woods. Consequently, rigid cellulosic/polymer composites are commonly used for applications such as interior and exterior decorative house moldings, picture frames, furniture, porch decks, deck railings, window moldings, window components, door components, roofing structures, building siding, and other suitable indoor and outdoor items. Nevertheless, a need still exists for a synthetic wood composition that is flexible and also has some or all of the benefits of rigid synthetic wood compositions.

The present invention provides a flexible wood composition. One example of the present invention is a composition comprising at least one cellulosic filler and a material selected from the group consisting of thermoplastic elastomers, melt-processible rubbers, and non-thermoplastic elastomers. Additionally, the composition may include other ingredients including, but not limited to, a stabilizer, a lubricant, and a process aid. As a result, the compositions of the present invention can be processed and shaped into resultant products having desired appearance, strength, durability, flexibility, and weatherability.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
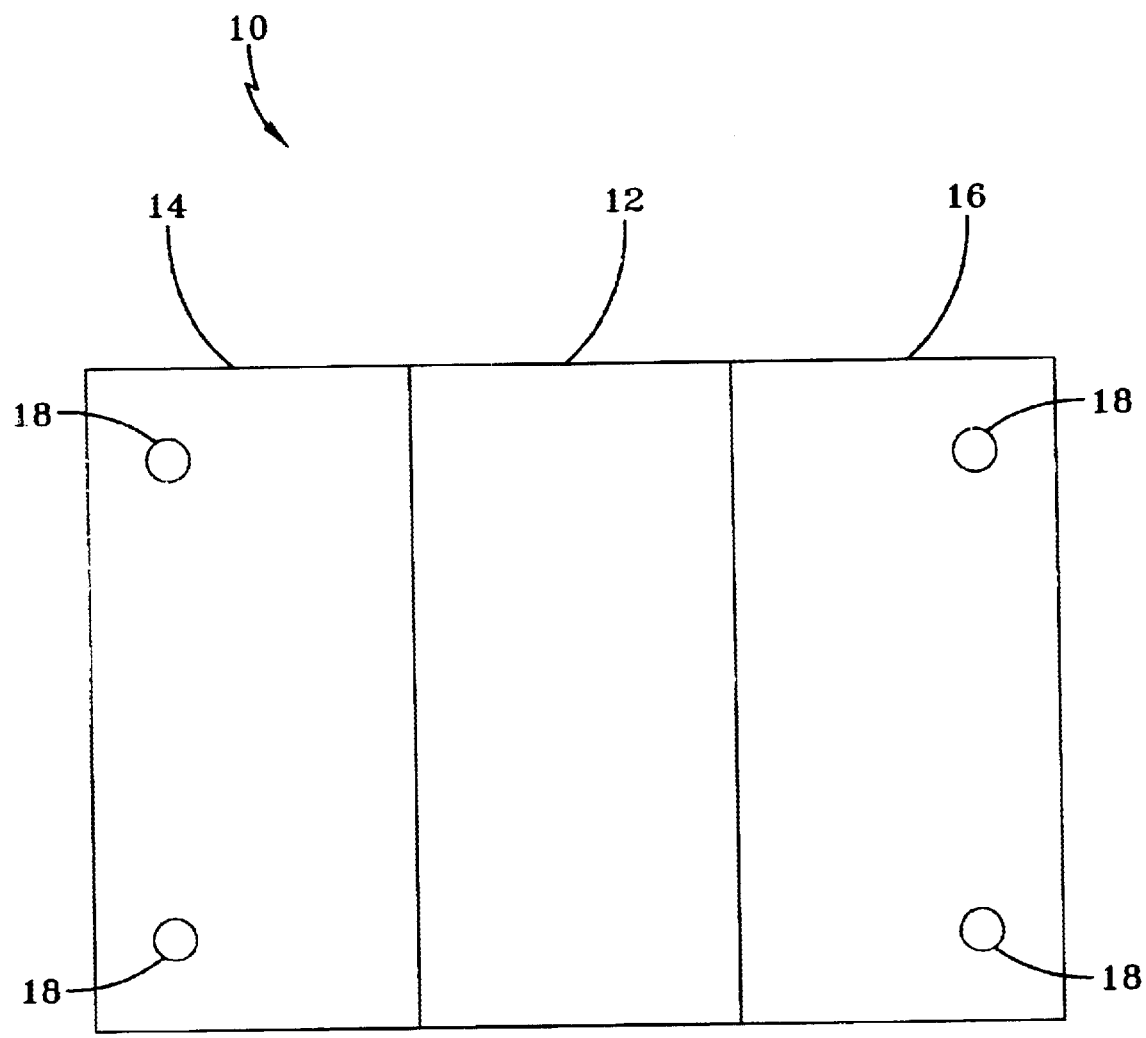
FIG. 1 is a side elevation view of a hinge made with a composite of the present invention.

The present invention is directed to a flexible wood composition. The composition of the present invention can be used in suitable applications as a substitute for natural wood, particleboard, wafer board, rigid synthetic wood compositions, metals, plastics, and other similar or conventional construction materials. For example, the composition can be used to make flooring, gaskets, stair treads, weather stripping, hinges, sound absorption components, trim, seals, grips, surface treatment for various surfaces, bumpers, toys, buttons, tubing, and other types of components that could benefit from the characteristics of the composition. Additionally, the composition could be used to make interior and exterior decorative house moldings, picture frames, furniture, furniture edges, porch decks, deck railings, window moldings, window components, door components, roofing structures, building siding, and other suitable indoor and outdoor items that do not exceed the structural capabilities of the composition.

FIG. 1 shows an example of a hinge 10. The hinge 10 has a flexible portion 12 made of a composition of the present invention. Portion 14 is attached to one edge of the flexible portion 12, and portion 16 is attached to the other edge of the flexible portion 12. Openings 18 extend through portion 14 and portion 16 such that mechanical fastening devices, e.g. screws or nails, can secure the hinge 10 to the items to be hinged together.

In a preferred embodiment, it is preferred that portion 14 and portion 16 are chemically bonded to the flexible portion 12. However, it should be recognized that they may be connected together by any similar, suitable, or conventional means including, but not limited to, an adhesive or mechanical fastening devices. Portion 14 and portion 16 may be made of a material that is similar or dissimilar to the composition used to make flexible portion 12. For example, the composition used to make the flexible portion 12 may be polyolefin-based, and the material used to make portion 14 and portion 16 may be vinyl-based, e.g., a relatively rigid polyvinyl chloride (PVC) synthetic wood composition.

The materials that may be used to make the composition of the present invention include, but are not limited to, cellulosic fillers, polymers, plastics, thermoplastics, inorganic fillers, cross-linking agents, lubricants, process aids, stabilizers, accelerators, inhibitors, enhancers, compatibilizers, blowing agents, foaming agents, thermosetting materials, colorants, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagasse, plant fibers, bamboo fiber, palm fiber, kenaf, and other similar, suitable, or conventional materials. Examples of plastics include thermoplastic elastomers, melt-processible rubbers, other similar, suitable, or conventional plastic materials, and formulations that incorporate any of the aforementioned plastics. Examples of inorganic fillers include talc, calcium carbonate, kaolin clay, magnesium oxide, titanium dioxide, silica, mica, barium sulfate, acrylics, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers, fatty acids, and other similar, suitable, or conventional materials.

One embodiment of the present invention is a composition comprised of at least one cellulosic filler and a plastic substance. The plastic substance is comprised of a thermoplastic elastomer and/or a melt-processible rubber. Alternatively, the plastic substance could be comprised of a non-thermoplastic elastomer, e.g., an elastomer that includes a thermosetting material. Examples of a thermoplastic elastomer include, but are not limited to, flexible PVC, polyolefin elastomers, thermoplastic olefins, thermoplastic urethanes, thermoplastic rubbers, and other similar, suitable, or conventional elastomer materials. Examples of polyolefin elastomers include chlorinated polyethylene and ENGAGE™ polyolefin elastomer. ENGAGE™ polyolefin elastomer is commercially available from DuPont Dow Elastomers L.L.C. An example of thermoplastic rubber is SANTOPRENE™ thermoplastic rubber, which is commercially available from Advanced Elastomer Systems. Furthermore, examples of melt-processible rubber include ALCRYN™ melt-processible rubber and other similar, suitable, or conventional materials. ALCRYN™ melt-processible rubber is commercially available from Advanced Polymer Alloys, LLC.

The plastic substance of the composition may optionally include other ingredients such as those listed above. In one preferred embodiment, the plastic substance further includes at least one stabilizer, at least one lubricant, and at least one process aid. An example of a process aid is a fatty acid such as stearic acid and other similar, suitable, or conventional acids.

The amounts of the various ingredients may be chosen to achieve the desired characteristics of the composition. In a preferred embodiment, the cellulosic filler is present in an amount less than about 75% by weight of the composition, more preferably between about 20% and about 55% by weight of the composition, and still more preferably between about 25% and about 50% by weight of the composition. On the other hand, the plastic substance preferably accounts for at least about 25% by weight of the composition, more preferably between about 45% and about 80% by weight of the composition, and still more preferably between about 50% and about 75% by weight of the composition. More particularly, the plastic substance of one preferred embodiment is comprised of: (a) a material selected from the group consisting of thermoplastic elastomers, melt-processible rubbers, and non-thermoplastic elastomers; (b) at least one stabilizer in a total amount of about 0.5 to about 2.5 parts per 100 parts of the material of (a); (c) at least one lubricant in a total amount of about 0.5 to about 2.0 parts per 100 parts of the material of (a); and (d) at least one process aid in an amount of about 0.3 to about 1.5 parts per 100 parts of the material of (a).

The composition can be processed by extrusion, compression molding, injection molding, and any other similar, suitable, or conventional processing techniques. After being processed, the composition preferably has a shore A hardness of between about 40 and about 95 as measured by a durometer. More preferably, the composition has a shore A hardness of between about 60 and about 80.

The cellulosic filler(s) may be dried to a desired moisture content. For example, the cellulosic filler(s) may be dried to about 0% to about 3% moisture content by weight, more preferably to about 0.5% to about 2% moisture content by weight. However, it is appreciated that the cellulosic filler(s) may have a moisture content greater than about 3% by weight.

The plastic substance can be comprised of virgin or recycled ingredients. In addition, the ingredients of the plastic substance can be in any form including, but not limited to, powder, pellets, chunks, granules, and other shapes. The plastic substance can be made by mixing a thermoplastic elastomer, a melt-processible rubber, and/or a non-thermoplastic elastomer with the other optional ingredients in a mixer. An example of a mixer is a high intensity mixer such as those made by Littleford Day Inc. or Henschel Mixers America Inc. Further examples of a mixer include a melt compounder and a co-rotating compounder. An example of a co-rotating compounder is a BANBURY™ mixer by the Farrel Corporation. The mechanically induced friction may, for example, heat the ingredients to a temperature between about 200° F. and about 230° F. After mixing, the ingredients may be cooled to ambient temperature.

The cellulosic filler(s) and the plastic substance may be mixed together prior to being further processed such as by extrusion or molding. For example, a low intensity mixer may be used to mix the cellulosic filler(s) and the plastic substance. An example of a low intensity mixer is a ribbon blender.

The composition may be processed in an extruder, a compression molding apparatus, or any other suitable, similar, or conventional apparatus in order to make a component. An example of an extruder is a conical, twin screw, counter-rotating extruder with a vent. A force feed hopper or crammer or any other suitable, similar, or conventional apparatus may be used to feed the materials into the extruder. The composite material may be extruded through a die system. The die system may have a compaction ratio between about 1:1 and 4:1. The die system may include an extended die land to provide sufficient back pressure for a uniform melt as well as compaction and shaping of the melt.

EXAMPLES

A flexible composition was made which comprised about 28% by weight of wood flour and about 72% by weight of plastic substance. The plastic substance was comprised of about 100 parts of chlorinated polyethylene, about 1.5 parts of tin stabilizer, about 0.7 part of stearic acid, and about 1 part of lubricant. The cellulosic filler and the plastic substance were mixed together and extruded in a twin screw extruder. The resultant product exhibited a smooth appearance and a shore A hardness of 80.

A second flexible composition was made which comprised about 40% by weight of wood flour and about 60% by weight of plastic substance. The plastic substance was comprised of about 100 parts of chlorinated polyethylene, about 1.5 parts of tin stabilizer, about 0.7 part of stearic acid, and about 1 part of lubricant. The cellulosic filler and the plastic substance were mixed together and extruded in a twin screw extruder. This resultant product also exhibited a smooth appearance and a shore A hardness of 80.

A third flexible composition was made which increased the wood flour content to about 60% by weight and reduced the plastic substance content to about 40% by weight. The plastic substance was comprised of about 100 parts of chlorinated polyethylene, about 1.5 parts of tin stabilizer, about 0.7 part of stearic acid, and about 1 part of lubricant. The cellulosic filler and the plastic substance were mixed together and extruded in a twin screw extruder. The resultant product exhibited a smooth appearance and an increased shore A hardness of 92.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the invention. It is the intention, therefore, to limit the invention only as indicated by the scope of the claims.

What is claimed is:

1. A composition consisting essentially of:
    at least one cellulosic filler in a total amount between about 20% and about 55% by weight of said composition; and
    a plastic substance in an amount between about 45% and about 80% by weight of said composition, said plastic substance consisting essentially of:
    (a) chlorinated polyethylene;
    (b) a tin stabilizer in an amount of about 0.5 to about 2.5 parts per 100 parts of said chlorinated polyethylene;
    (c) a lubricant in an amount of about 0.5 to about 2.0 parts per 100 parts of said chlorinated polyethylene; and
    (d) a fatty acid in an amount of about 0.3 to about 1.5 parts per 100 parts of said chlorinated polyethylene.

2. The composition of claim 1 wherein:
    said at least one cellulosic filler is present in a total amount between about 25% and about 50% by weight of said composition; and
    said plastic substance is present in an amount between about 50% and about 75% by weight of said composition.

3. The composition of claim 1 wherein said composition has a shore A hardness of between about 40 and about 95.

4. The composition of claim 3 wherein said composition has a shore A hardness of between about 60 and about 80.

* * * * *